Figures 1, 2:
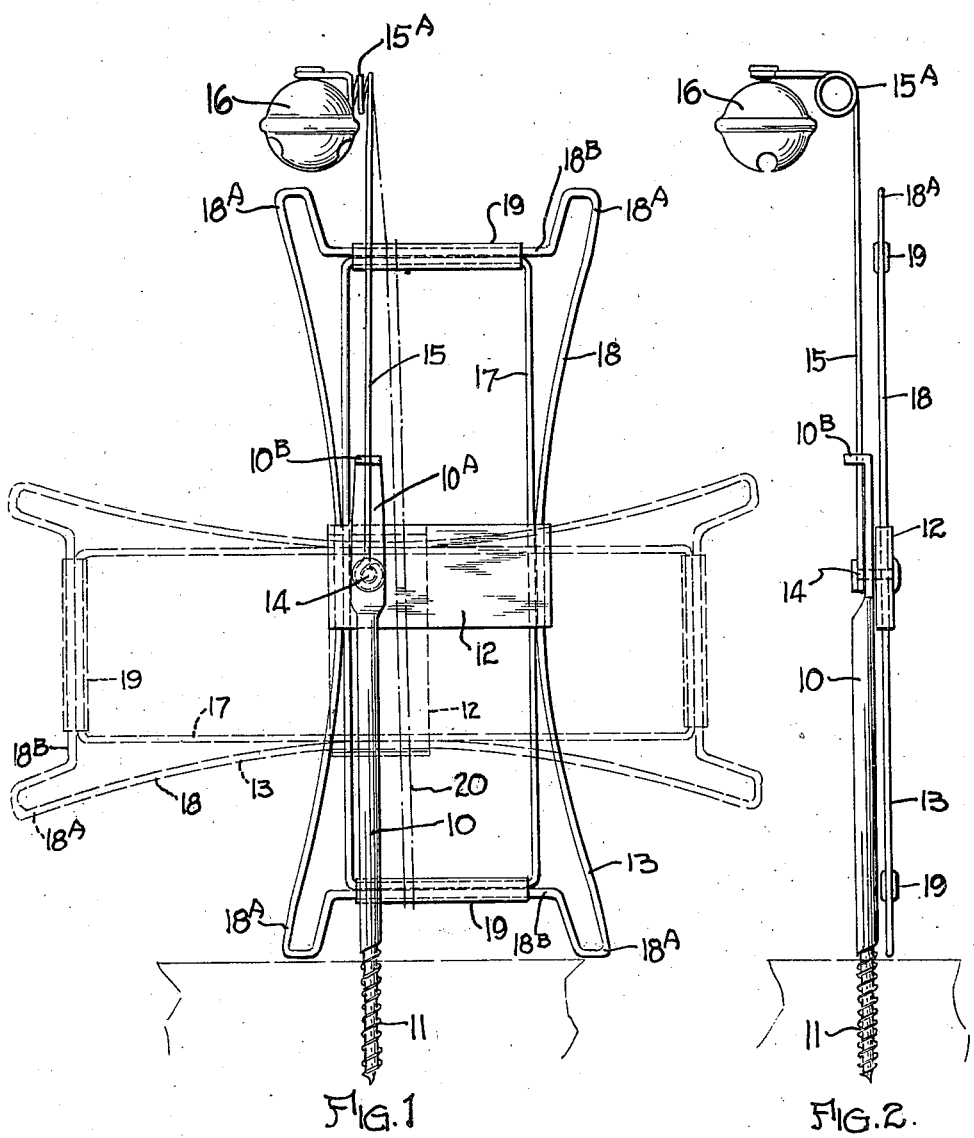

Aug. 5, 1924.

J. SUBERT ET AL 1,503,967

FISHING DEVICE

Filed April 28, 1922

INVENTORS
Joseph Subert
Anton Jedlicka
By Frank Schraeder Jr.
Attorney

Patented Aug. 5, 1924.

1,503,967

UNITED STATES PATENT OFFICE.

JOSEPH SUBERT, OF OAK PARK, AND ANTON JEDLICKA, OF BERWYN, ILLINOIS.

FISHING DEVICE.

Application filed April 28, 1922. Serial No. 557,189.

*To all whom it may concern:*

Be it known that we, JOSEPH SUBERT and ANTON JEDLICKA, citizens of the United States of America, residing at 1516 Euclid Avenue, Oak Park, Cook County, Illinois, and 2313 So. 62nd Court, Berwyn, Cook County, Illinois, respectively, have invented a new and useful Improvement in Fishing Devices, of which the following is a specification.

This invention relates to fishing devices and has for its object the provision of a combined fish line holder and alarm.

It is also an object to provide a simple and novel construction for a fish line holder which could be used independently of the alarm.

With these and other objects in view our invention consists in the novel construction, combination and relative position of the parts and members hereinafter described and shown in the accompanying drawings, and particularly pointed out in the appended claim.

Referring to the drawing in which like reference characters indicate like or corresponding parts:

Figure 1 illustrates a front elevation of a fish line holder and alarm embodying our invention and Figure 2 a side elevation thereof.

Referring to the illustrations, the alarm and line holder comprises a rod alarm bell holder 10 which can be pointed at one end or preferably provided with a screw 11 for securing into operative position as indicated. The other end of the holder 10 is flattened at 10$^A$ and pivotally mounted at 14 to a flat band 12 which engages the line holder 13. Also pivotally supported about the pivotal pin 14 is a resilient or wire alarm support 15 which extends through the outwardly or laterally disposed end 10$^B$ of the flattened portion 10$^A$. The upper end, which is coiled as at 15$^A$ terminates with a bell alarm 16.

The line holder indicated generally by numeral 13, comprises two wire frame members 17 and 18, retained together with suitable end bands 19 and by the central supporting band 12.

The inner frame member 17 is formed substantially rectangular and is fitted within the outer frame member 18, which is irregular in form, being held adjacent the member 17 midway its length and between the band 12 and flaring outwardly toward its ends to form ears 18$^A$ which extend beyond its end portions 18$^B$. The end portions 18$^B$ are together with the ends of the inner frame, held securely by the bands 19 which form smooth ends about which the fish line is wound as shown by dot and dash lines 20.

It is obvious that in fishing, only the desired length of line need be unwound from the holder 13, and the balance retained on the holder. The used portion of the line is given a few turns in the coil portion 15$^A$ and the entire device is then screw mounted where desired to signal or alarm each "bite" or pull of the fish on the line. The line holder can be positioned as shown either in full or in the dotted line position.

We claim:

A fish line holder comprising a wire frame having an inner substantially rectangular section, an outer section, a band embracing both sections midway their ends, said outer section having the corners thereof extending beyond its ends and the adjacent ends of said inner rectangular section, and securing bands extending between said extending corners and embracing the adjacent ends of said inner and outer sections.

In witness whereof, we have hereunto subscribed our names this twenty-fifth day of March, 1922.

JOSEPH SUBERT.
ANTON JEDLICKA.